March 13, 1928.
O. G. SIMMONS
1,662,589
MEANS FOR CONTROLLING MOVEMENTS OF WORK CARRYING SPINDLE WITH RESPECT TO
A CUTTING ELEMENT IN GEAR GRINDING MACHINES AND THE LIKE
Filed Nov. 26, 1926   3 Sheets-Sheet 1
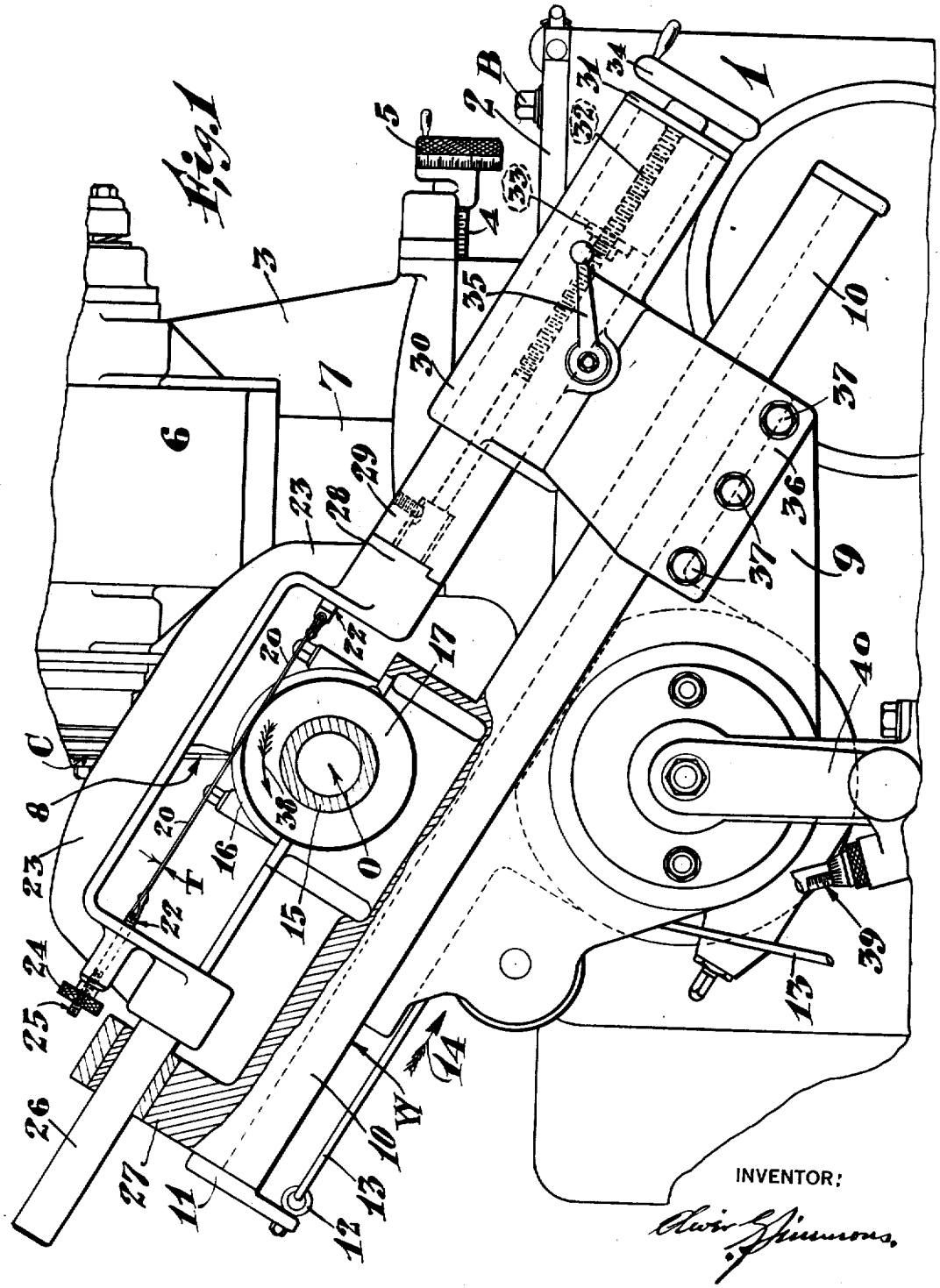
INVENTOR:
Oscar G. Simmons

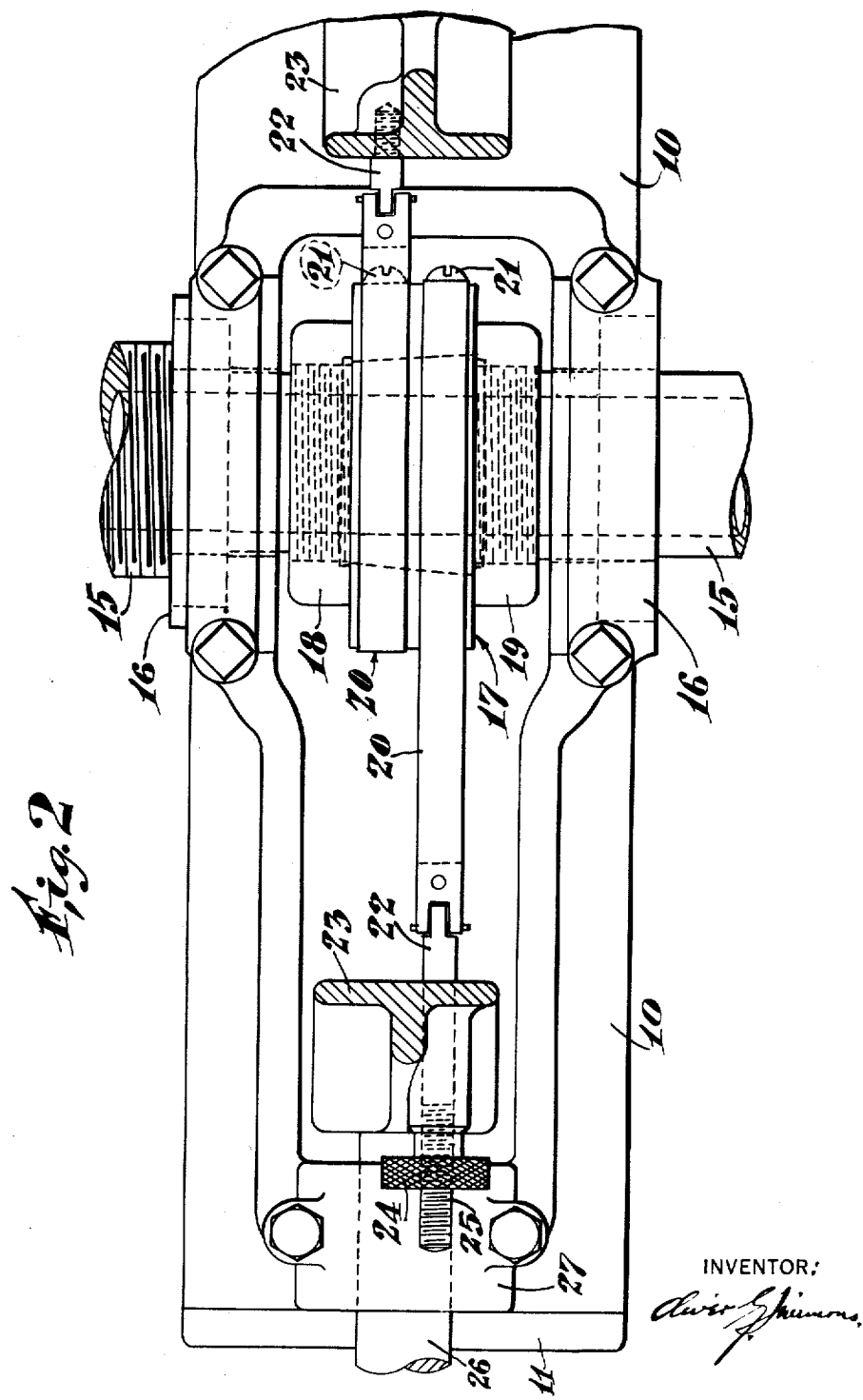

March 13, 1928.
O. G. SIMMONS
1,662,589
MEANS FOR CONTROLLING MOVEMENTS OF WORK CARRYING SPINDLE WITH RESPECT TO
A CUTTING ELEMENT IN GEAR GRINDING MACHINES AND THE LIKE
Filed Nov. 26, 1926     3 Sheets-Sheet 3
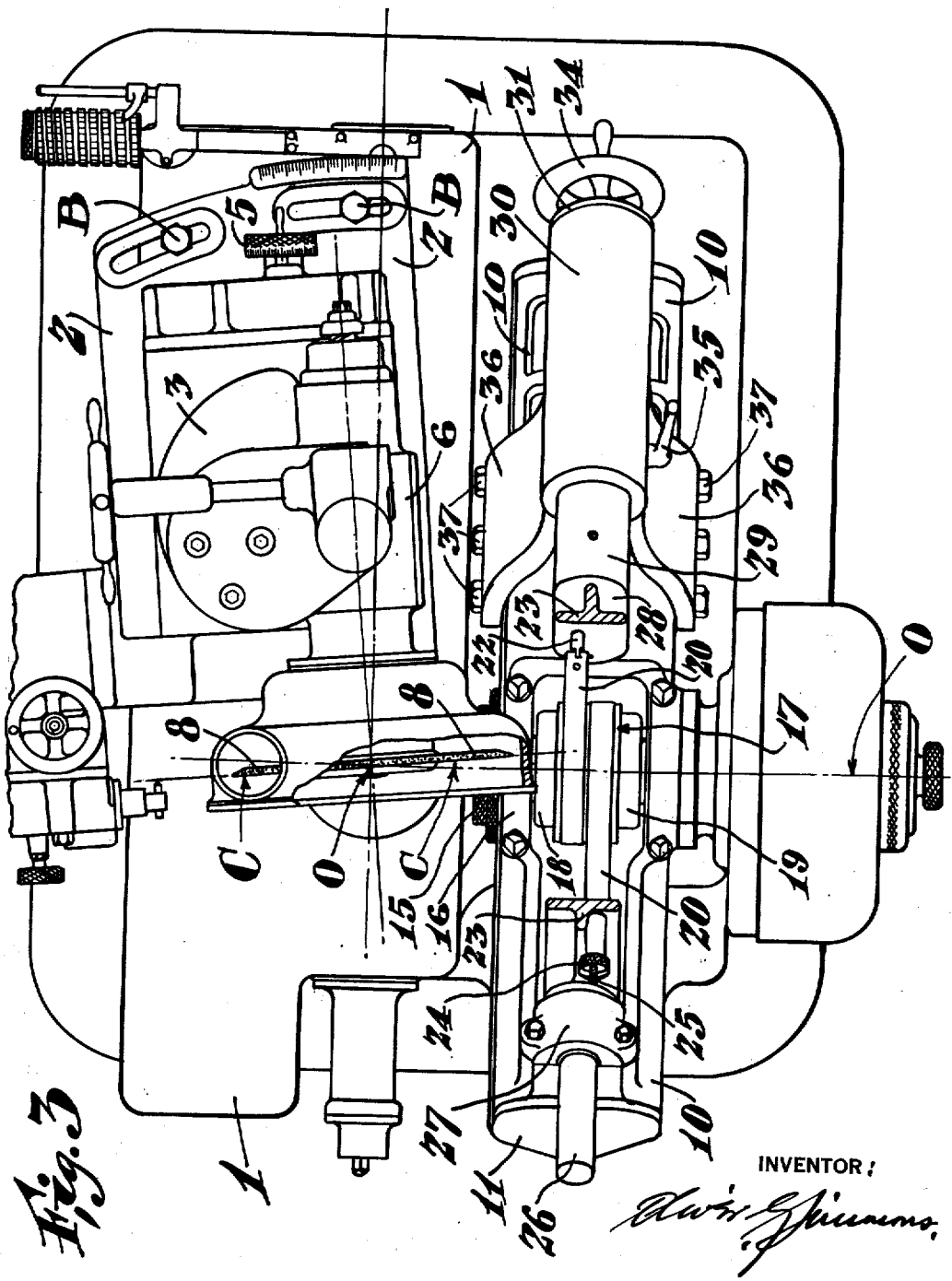
INVENTOR!

Patented Mar. 13, 1928.

1,662,589

UNITED STATES PATENT OFFICE.

OLIVER G. SIMMONS, OF LAKEWOOD, OHIO.

MEANS FOR CONTROLLING MOVEMENTS OF WORK-CARRYING SPINDLE WITH RESPECT TO A CUTTING ELEMENT IN GEAR-GRINDING MACHINES AND THE LIKE.

Application filed November 26, 1926. Serial No. 150,865.

My invention relates to improved means for controlling oscillating rotary, and rectilinear reciprocating movement of work-carrying spindle in gear and gear shaper cutter grinding machines and the like, preferably for machines one of which is illustrated and described in applicant's pending application for Letters Patent, Serial No. 98,791, filed March 31st, 1926.

In grinding gear shaper cutters it is preferable to cause the rectilinear movement of the work spindle to reverse itself at a predetermined point with respect to the tooth of the work being ground for the reason in certain designs of gear shaper cutters it is desirable to leave a given amount of metal at the flanks of the teeth, that is to say, adjacent the base circle, which is known commercially as flank fullness. This flank fullness when provided in the design of gear shaper cutters will remove a certain amount of metal from the tops of the teeth of the gear cut by the gear shaper cutter, thus modifying the involute form of tooth from the desired involute. The teeth of a gear produced by such a cutter is well-known in the art and is referred to as a gear in which the teeth have been eased-off. This is done to prevent interference when the teeth of the gear are relatively long and the pressure angle is low. It is also done as a compromise to compensate for slight inaccuracies in the gear teeth which have been introduced as mechanical errors of workmanship or errors of hardening introduced at the time the gear is heat-treated. It is said that gears provided with eased-off teeth, as described, permit greater tolerance limits of error. Gears made with eased-off teeth, therefore, do not have what is known commercially as a full tooth bearing. The bearing, it is obvious, will be held to a point some distance below the top of the tooth of the gear, and the magnitude of the measure of this is dependent upon the amount of flank fullness in the gear shaper cutter previously referred to. The measure of the flank fullness of gear shaper cutters being controllable, it is obvious that a mechanism comprising means of adjustment which will function while the machine is in operation is preferable. Means containing mechanism for functioning in machines as referred to have been proposed heretofore by the applicant in pending application for letters patent above referred to and other copending applications, Serial No. 125,369, filed July 28th, 1926, and Serial No. 131,885, filed August 27th, 1926.

The main object of the invention therefore resides in the means for causing a work-carrying spindle to oscillate about its axis and to reciprocate bodily in a line perpendicular to the axis of said spindle and to control the position of reverse of said reciprocal movement by the movement of a cooperating member, which member is operable to effect the adjustment without interference of the operation of the work spindle.

Another object of the invention resides in the means for swivelling the plane of the reciprocal movement of the spindle and its cooperating members so that the present invention will function as herein described at any given pressure angle at which the machine containing this invention is designed to be adjusted within range of its capacity.

A further object of the invention is to provide correlated mechanical means for machines adapted to generate the curved teeth of gears, gear shaper cutters and all kindred articles of manufacture.

A still further object of the invention resides in providing the work-carrying spindle with a pitch or base circle disc fixedly secured thereto, a swivelling member adapted to carry a movable member, one part of which is in the form of a yoke adapted to carry members, preferably flexible members, connected to said pitch or base circle disc, an end extension on said yoke member adapted to be journalled in an end portion of a slide, means to position said yoke member in a plane parallel to the plane of rectilinear movement of said slide, means to fixedly secure said yoke member in said adjusted position, means to angularly adjust swivel member upon which is mounted the aforesaid slide to an angle equal to the complemental pressure angle with respect to the face of a cutting element, means to angularly adjust said cutting element about a vertical center line to the angle of the helix of the teeth of the work and means to cause an oscillating movement to said work spindle or rectilinear movement to said slide, preferably oscillating movement to said work spindle whereby said slide is caused to reciprocate uniformly or nonuniformly as the oscillating movement of the work spindle is uniform or nonuniform.

With the above and still other objects in view the invention comprises a work-carrying spindle, means to simultaneously reciprocate and oscilllate said work spindle, and means connected therewith controlling the position of reverse of said reciprocating motion to produce flank fullness or non-flank fullness in gears and gear shaper cutters, as illustrated in the accompanying drawings hereinafter described and particularly set forth in the appended claims together with such variation and modification as will be apparent to those skilled in the art to which the invention appertains. Reference should be made to the accompanying drawings forming a part of this specification.

Fig. 1 is a side elevation partly in fragmentary section illustrating the application of this invention to one well known grinding machine.

Fig. 2 is a plan view partly in fragmentary section of the present invention.

Fig. 3 is a top plan view of the machine.

The numeral 1 indicates the bed of the machine upon which is mounted upright swivel base 2. The upright 3 is adapted to engage the slide on swivel base 2 through the medium of V-ways, not shown, by means of the screw 4 having threaded engagement with swivel base 2, the hand-wheel 5 being secured to said screw 4. The adjustable vertical slide 6 is adapted to engage V-ways 7 on upright 3 which the adjustable vertical slide 6 engages. The cutting element 8, which may be an abrasive wheel or a milling cutter, is carried by a spindle in the slide 6. The cutting element 8 may be rotated by any suitable means. Swivel member 9 is adjustably mounted on a bearing carried by the bed 1. Slide 10 engages V-ways on swivel member 9 and is adapted to move in a rectilinear path thereof. The end plate 11 is secured to the left end portion of the slide 10 to which is fixedly secured the eye-bolt 12, through which the cable 13 is passed and secured. The other end of the cable 13 is attached to a weight which causes slide 10 to exert constant force in one direction as shown by the arrow 14.

The work spindle 15 is journalled in a portion 16 of the slide 10. The disc 17 is fixedly secured to work spindle 15 and held in said fixed position by means of the nuts 18 and 19, see Fig. 2, which have threaded engagement with said work spindle 15. Steel tapes 20, substantially semisurround disc 17, one end of which is fixedly secured thereto preferably by means of button-head screws 21, the other end of which tapes are coupled to threaded screw members 22, each of which is carried by the yoke 23, one of which coupled connection provides means for tensioning said tapes 20 through the medium of nut 24 having threaded engagement with an end portion 25 of one of the screw members 22. The yoke member 23 is provided, preferably at the left-hand end thereof of the person viewing the drawing, Fig. 1, with a shaft extension 26 which is adapted to be journalled and reciprocate in the extension 27 of the slide 10, whereas the right-hand end 28 of said yoke 23 is preferably fixedly secured to the spindle 29, said spindle 29 being carried by the tail-stock member 30, said tail stock member 30 being provided with an end flange 31 in which is journalled tail-stock screw 32, one end of which screw 32 has threaded engagement with nut 33 fixedly secured to spindle 29, the other end of which screw is adapted to receive the hand-wheel 34 by any suitable means, preferably by means well-known in the art, so that as hand-wheel 34 is rotated, spindle 29 and yoke 23 will be moved to the right or to the left of the person viewing the drawing, Fig. 1. This movement of yoke 23 will cause work spindle 15 to rotate a slight amount, if slide 10 is restrained, either clockwise or anticlockwise dependent upon the measure of the magnitude of the rectilinear movement of the yoke 23 and the direction of said movement. The rotary movement of work spindle 15, as referred to, is therefore obviously independent of other rotary movement of the work spindle and rectilinear movement of slide 10 or absence of said movement of slide 10. If, however, work spindle 15 is restrained from rotary movement, then the movement of yoke 23 as described will result in effecting a bodily rectilinear movement of slide 10, yoke 23 and component members carried by the yoke and slide as described and, vice versa, if the slide 10 is restrained from movement as referred to there will be a rotary movement only of work spindle 15 if the yoke 23 is moved as described. Either members, 10 or 15, may be restrained as referred to. In the practice of my invention, however, I prefer to restrain the work spindle and move the members aforesaid as a unitary part when yoke 23 is moved as described. However, in the practice of this invention it is immaterial which member is restrained in the aforesaid movement of the yoke 23, and since it is not necessary to restrain both members in the movement aforesaid, one only being necessary, it is obvious in the embodiment of the invention in a machine, for the purpose of this specification, that one member will have to be selected by the applicant as the restraining member. The choice must be made and I have therefore preferably selected to restrain the work spindle 15, although in the practice of my invention I could just as easily and by the same line of reasoning select the member 10 as the member to be restrained in the movement of the yoke 23. The choice is influenced by the necessity of describing the application of this invention to one of several well-known grinding machines. I will describe briefly, therefore, one well-known machine in which the spindle is adapted to be restrained in the movement of the yoke 23, but it must be understood that my invention is not limited to gear grinding machines in which the work spindle is restrained from movement, because the invention is adaptable for use in grinding machines in which the slide 10 is restrained from movement and the application of this invention to such machine could be made just as readily. It will appear later by restraining the movement of work spindle 15, or slide 10, that it merely resolves itself to a question of whether in the functional operation of gear grinding machines the rotation of the spindle causes the slide to move or whether by moving the slide the spindle is caused to rotate. In the former, power is applied to the spindle and in the latter, the power is applied to the slide as is well known in the art.

Tail stock member 30 is preferably provided with lever arm 35 which is adapted to fixedly secure tail stock spindle 29 as is well known in the art. The tail stock member 30 is preferably provided with a yoke portion 36 which yoke portion surrounds slide 10 and is fixedly secured to swivel member 9 by means of the bolts 37, so that as swivel member 9 is adjusted to the pressure angle of the gear or gear shaper cutter to be ground, the connected members including slide 10, tail stock member 30 and yoke 23 will be swivelled as a unitary part.

If the work spindle 15 is given rotary motion, uniform or nonuniform, the disc 17 through the medium of the tapes 20, will cause slide 10 to move and if the rotary movement of the work spindle 15 is in the form of an oscillating movement, the slide 10 will be caused to reciprocate back and forth on the swivel 9, and if the movement of the work spindle 15 is uniform then the movement of the slide will be uniform and if the movement of the work spindle is nonuniform the movement likewise of the slide will be nonuniform, and the magnitude of the movement, whether it is uniform or nonuniform, is dependent upon the diameter of the disc 17; for example, if the base circle 17 has a perimeter measure of sixteen inches, the slide will move sixteen inches if the disc 17 is given one turn and in dirct ratio thereto for any fractional part of a turn.

In the practical application of tapes 20 and disc 17, the actual movement of slide 10 will be to a theoretical disc diameter equal to the diameter of the disc plus the thickness T of the tape 20, so that the disc 17 is made the theoretical diameter minus the thickness T of the tapes 20, but the effective diameter is nevertheless the theoretical diameter as is well understood in the art.

One end portion of the cable 13 being secured to the end portion of the slide 10, having a weight attached to the other end of said cable 13, will cause slide 10 to move in the direction of the arrow 14 to a position of rest determined by the tension of the tapes 20 of the disc 17 and lost motion in any connecting parts. When force is applied to oscillate the work spindle 15, slide 10 is actuated to move to lift the weight at the end of the cable 13, and when the motion of the work spindle is reversed to the opposite direction the weight continues to exert its force so that in the functional operation of the means herein disclosed, as applied to a grinding machine of the character set forth, will cause a given point on the work spindle 15 to travel in a true geometrical path which has not been found to be true when the weight referred to is absent. Moreover, the weight on the end of the cable 13 exerting constant force always in one direction will keep the slide 10 to its lowermost position to the right of the person viewing the drawing, Fig. 1. This force component, as stated, being constant will cause the work spindle 15 to exert a constant rotative force in the direction of the arrow 38, and this force will be overcome by the positive mechanical means applied to the work spindle 15, through the medium of members of the connecting rod 39 and the bell-crank 40, in an application of the present invention to the machine referred to.

If now, the machine is operating and the work spindle oscillating and the slide reciprocating as described, it is obvious that an additional independent rectilinear movement will be given to the slide 10 if the hand-wheel 34 is rotated. The object of this independent movement to the slide, which is a movement of adjustment, is for the purpose of controlling flank fullness or absence of flank fullness in gear shaper cutters and the like, as previously referred to, and fully set forth in application pending for letters patent herein referred to. Flank fullness, therefore, in any gear shaper cutter and the like is controlled in the present invention by the relative movement of slide 10 with respect to the fixed position of the cutting element 8, and if no flank fullness is required, it is only necessary to allow the slide 10, which carries the work spindle 15, to move further to the right of the person viewing the drawing, Fig. 1. This is accomplished as stated by rotating hand-wheel 34 to effect the adjustment referred to. If, however, flank fullness is required it is merely necessary to cause slide 10 to reverse its movement, and return to its former position before the center O, of the work spindle 15, coincides with the cutting face C, of the cutting element 8. The position of the axis O, therefore, to the cutting face C, is controlled by the position of the tail stock spindle 29. In grinding gear shaper cutters, which may have helically arranged teeth, it is necessary to swivel the cutting element 8 about a vertical axis coincident with the cutting face C. This is provided for by means of the swivel upright base 2. This may be swivelled on bed 1, in a plane perpendicular to the plane of drawing, Fig. 1, to any desired angle corresponding to the helical angle of the teeth of the gear shaper cutter, plus any additional amount required or desired for clearance to said teeth and when so swivelled, said swivel base 2 may be locked in that position by means of the bolts B, passing through an elongated slot in said swivel base 2, and having threaded engagement with bed 1.

It may be stated that the invention herein disclosed is applicable to gear and gear shaper cutter grinding machines in general, and in the application of the present invention to the machine referred to, wherein a swivel member 9 is disposed to the pressure angle desired in the gear, when operating on the moulding generating principle of action, to the end that cutting face C of the cutting element 8 with the sliding-ways W of the slide 10, form an angle equal to the complemental pressure angle desired in the cutters or gears. It is only necessary, therefore, where the pitch diameter remains fixed, to obtain a different pressure angle in a gear or cutter, to merely adjust swivel 9 to the desired angle of pressure. This is accomplished by any suitable means, as for example, means illustrated and described in copending application filed March 31st, 1926, Serial No. 98,791.

If, however, it is desired to operate on the describing generating principle of action, slide 10 will be adjusted to zero pressure angle, that is to say, the cutting face C of the cutting element 8 will form an angle of substantially ninety degrees with the sliding-ways W of the slide 10, and when so adjusted the periphery of disc 17 is truly a base circle and the face C, of the cutting element 8, will generate true involute curves in the teeth of gears and the like, having the disc 17 as a base circle. This must not be confused with disc 17 being the pitch circle when operating on the moulding generating principle of action, wherein the slide 10 is disposed with swivel member 9 to the angle of pressure as previously described.

The two principles of action herein referred to are fully set forth in the book "Gear Cutting Machinery" by Ralph E. Flanders, published by John Wiley & Sons, New York. The difference between the two principles of action herein referred to are also fully set forth in my copending application for Letters Patent, Serial 131,885, filed August 27th, 1926, previously referred to.

Having thus described my invention I claim:

1. In a machine of the character set forth, a slide, a guideway for the slide, a work spindle on the slide, a disc fixed to the spindle, a yoke partially surrounding said work spindle, oppositely disposed tapes secured to the periphery of the disc and to the yoke at opposite sides of the spindle, means for oscillating said spindle, and means for moving the yoke along the guideway and for securing the same in adjusted positions with respect thereto.

2. In a machine of the character set forth a slide, a guideway for the slide, a work spindle on the slide, a disc fixedly secured thereto, tapes at one end thereof secured to said disc, a yoke which partially surrounds said work spindle to which the opposite ends of the tapes are secured, a slide carrying said work spindle mounted upon a swivel member, a cutting element and means to angularly adjust said swivel member and said cutting element to the complemental angle of pressure, means for oscillating said spindle, and means for adjusting said yoke along said guideway.

3. In a machine of the character set forth, a work spindle, a slide carrying the work spindle, a swiveling member carrying the slide, a pitch circle disc or a base circle disc fixedly secured thereto, tapes at one end thereof secured at said pitch circle disc or said base circle disc, an adjustable yoke which partially surrounds said work spindle to which the other ends of the tapes are secured, an adjustable tail stock spindle connected to said yoke, a tail stock member carrying said yoke having a portion straddling the slide carrying said work spindle, said portion being fixedly secured to a swivelling member carrying said slide, and means to position said yoke member with respect to said tail stock member whereby the flank fullness of the teeth of gear shaper cutters is controlled as set forth.

4. In a machine of the character set forth, a slide, a guideway for the slide, a work spindle on the slide, a disc fixed to the spindle, a yoke partially surrounding said work spindle, oppositely disposed tapes secured to the periphery of the disc and to the yoke at opposite sides of the spindle, means for oscillating said spindle, means for moving the yoke along the guideway and for securing the same in adjusted positions with respect thereto, a cutting element, and means to angularly adjust the face of the cutting element with respect to the axis of said spindle.

5. In a machine of the character set forth, a work carrying spindle with a disc fixedly secured thereto, a swivelling member adapted to carry a movable member, one part of which is in the form of a yoke adapted to carry members, preferably flexible members, connected to said disc, an end extension on said yoke member adapted to be journalled in an end portion of a slide, means to position said yoke member in a plane parallel to the plane of rectilinear movement of said slide, means to fixedly secure said yoke member in said adjusted position, means to angularly adjust swivel member upon which is mounted the aforesaid slide to an angle equal to the complemental pressure angle with respect to the face of a cutting element, means to angularly adjust said cutting element about a vertical center line to the angle of the helix of the teeth of the work, means to cause an oscillating movement to said work spindle or a rectilinear movement to said slide, preferably oscillating movement to said work spindle, whereby said slide is caused to reciprocate uniformly or nonuniformly as the oscillating movement of the work spindle is uniform or nonuniform.

Signed this 23rd day of November, 1926.

OLIVER G. SIMMONS.

element with respect to the axis of said spindle.

5. In a machine of the character set forth, a work carrying spindle with a disc fixedly secured thereto, a swivelling member adapted to carry a movable member, one part of which is in the form of a yoke adapted to carry members, preferably flexible members, connected to said disc, an end extension on said yoke member adapted to be journalled in an end portion of a slide, means to position said yoke member in a plane parallel to the plane of rectilinear movement of said slide, means to fixedly secure said yoke member in said adjusted position, means to angularly adjust swivel member upon which is mounted the aforesaid slide to an angle equal to the complemental pressure angle with respect to the face of a cutting element, means to angularly adjust said cutting element about a vertical center line to the angle of the helix of the teeth of the work, means to cause an oscillating movement to said work spindle or a rectilinear movement to said slide, preferably oscillating movement to said work spindle, whereby said slide is caused to reciprocate uniformly or nonuniformly as the oscillating movement of the work spindle is uniform or nonuniform.

Signed this 23rd day of November, 1926.

OLIVER G. SIMMONS.

CERTIFICATE OF CORRECTION.

Patent No. 1,662,589.      Granted March 13, 1928, to

OLIVER G. SIMMONS.

It is hereby certified that error appears in the printed specification of the above numbered patent requiring correction as follows: Page 4, line 105, claim 3, for the word "at" read "to"; and that the said Letters Patent should be read with this correction therein that the same may conform to the record of the case in the Patent Office.

Signed and sealed this 3rd day of April, A. D. 1928.

Seal.      M. J. Moore,
Acting Commissioner of Patents.

CERTIFICATE OF CORRECTION.

Patent No. 1,662,589.             Granted March 13, 1928, to

OLIVER G. SIMMONS.

It is hereby certified that error appears in the printed specification of the above numbered patent requiring correction as follows: Page 4, line 105, claim 3, for the word "at" read "to"; and that the said Letters Patent should be read with this correction therein that the same may conform to the record of the case in the Patent Office.

Signed and sealed this 3rd day of April, A. D. 1928.

Seal.

M. J. Moore,
Acting Commissioner of Patents.